(12) United States Patent
Atzinger et al.

(10) Patent No.: US 8,723,120 B2
(45) Date of Patent: May 13, 2014

(54) SENSOR ELEMENT AND X-RAY DETECTOR COMPRISING A PLURALITY OF SENSOR ELEMENTS

(75) Inventors: Franz Atzinger, Nürnberg (DE);
Gerhard Hahm, Erlangen (DE);
Raphael Henrich, Neunkirchen am Brand (DE); Carsten Illenseer, Möhrendorf (DE); Christoph Jablonski, Berlin (DE); Bernhard Sandkamp, Erlangen (DE); Markus Schild, Herzogenaurach (DE); Michael Stark, Forchheim (DE); Fabian Wloka, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 139 days.

(21) Appl. No.: 13/403,825

(22) Filed: Feb. 23, 2012

(65) Prior Publication Data

US 2012/0261584 A1   Oct. 18, 2012

(30) Foreign Application Priority Data

Feb. 23, 2011   (DE) .......................... 10 2011 004 589

(51) Int. Cl.
*G01T 1/00* (2006.01)
*G01L 7/00* (2006.01)

(52) U.S. Cl.
USPC ........................................ 250/336.1; 73/1.57

(58) Field of Classification Search
USPC ................ 250/336.1, 372, 393, 394; 73/1.57
See application file for complete search history.

(56) References Cited

U.S. PATENT DOCUMENTS

| | | | |
|---|---|---|---|
| 4,262,202 A | 4/1981 | Cusano et al. | 250/366 |
| 4,719,354 A | 1/1988 | Whetten | 250/385 |
| 2003/0178566 A1 | 9/2003 | Schriever et al. | 250/336.1 |
| 2004/0114775 A1* | 6/2004 | Chang | 381/191 |
| 2009/0003631 A1* | 1/2009 | Izuchi et al. | 381/174 |

FOREIGN PATENT DOCUMENTS

DE         10213482 B4    9/2007   ................ G01T 1/18

OTHER PUBLICATIONS

Merck KGaA, Periodic Table of Elements, "Iodine," Retrieved from the Internet [Sep. 30, 2013]; Retrieved from url <http://pse.merck.de/merck.php?lang=EN>.*
NASA, "Phases of Matter", Glenn Research Center, Retrieved from the Internet [Sep. 30, 2013]; Retrieved from url <htttp://www.grc.nasa.gov/WWW/BGH/state.html>.*
German Office Action, German Patent Application No. 10 2011 004 589.9, 4 pages, Feb. 24, 2012.

* cited by examiner

*Primary Examiner* — David Porta
*Assistant Examiner* — Yara B Green
(74) *Attorney, Agent, or Firm* — King & Spalding L.L.P.

(57) ABSTRACT

A sensor element is provided for conversion of x-radiation into an electrical measurement signal, the sensor element including an x-radiation-absorbing fluid arranged in a housing, and a pressure sensor arranged to detect a pressure of the fluid on the pressure sensor and convert the detected pressure into an electrical measurement signal. A plurality of such sensor elements may be arranged in a matrix-type arrangement to form an x-ray detector.

18 Claims, 1 Drawing Sheet

SENSOR ELEMENT AND X-RAY DETECTOR COMPRISING A PLURALITY OF SENSOR ELEMENTS

CROSS-REFERENCE TO RELATED APPLICATIONS

This application claims priority to DE Patent Application No. 10 2011 004 589.9 filed Feb. 23, 2011. The contents of which is incorporated herein by reference in its entirety.

TECHNICAL FIELD

The present disclosure relates to sensor elements for use in an x-ray detector, and x-ray detectors comprising a plurality of sensor elements.

BACKGROUND

X-ray detectors for measuring x-radiation are typically implemented by the x-radiation being absorbed and a measurement signal being generated therefrom. To this end a number of approaches to solutions exist. For certain x-ray detectors with scintillators the x-ray quanta are converted into light by means of the scintillator and the light is converted for example by a matrix of photodiodes into an electrical measurement signal. One possible problem with this approach is that the light may be scattered and broken within the scintillator so that the light of a single x-ray quantum is frequently detected distributed over a number of matrix elements and the result of this is an inadequate resolution of the measurement signal. For certain x-ray detectors with semiconductor-based direct converters (e.g. As, CdTe) electrical charges generated directly by the x-ray quantum is read out as a measurement signal. One possible disadvantage of direct converters however is that their x-ray absorption is often of low quality at high energies or that producing them at high quality in the necessary volume may be very expensive.

In addition a high voltage may be necessary in order to separate the charges and read them out.

SUMMARY

In an embodiment, a sensor element for converting x-radiation into an electrical measurement signal includes an x-radiation-absorbing fluid arranged in a housing or a chamber, and a pressure sensor arranged so that a pressure of the fluid on the pressure sensor is able to be measured by the latter and is able to be converted into an electrical measurement signal. In a further embodiment, the pressure sensor has a capacitor and a membrane. In a further embodiment, the x-radiation-absorbing fluid is iodine. In a further embodiment, the sensor element is fabricated at least partly in silicon technology.

In another embodiment, an x-ray detector having an active matrix includes a plurality of sensor elements arranged so that a pressure of an x-radiation-absorbing fluid on the pressure sensor is able to be measured by the latter and is able to be converted into an electrical measurement signal.

In another embodiment, a medical x-ray device includes an x-ray source and an x-ray detector. The x-ray detector x-ray detector has an active matrix including a plurality of sensor elements arranged so that a pressure of an x-radiation-absorbing fluid on the pressure sensor is able to be measured by the latter and is able to be converted into an electrical measurement signal.

BRIEF DESCRIPTION OF THE DRAWINGS

Example embodiments will be explained in more detail below with reference to figures, in which.

DETAILED DESCRIPTION

Certain embodiments provide a sensor element as well as an x-ray detector which makes high-quality absorption of x-ray quanta and a high-quality resolution possible and in addition are able be manufactured at as little expense as possible.

In some embodiments, a sensor element for converting x-rays into an electrical measurement signal includes an x-ray-absorbing fluid arranged in a housing or a chamber and also a pressure sensor arranged such that a measurement value for the pressure of the fluid is able to be measured and converted into an electrical measurement signal. The measurement principle may be as follows: The x-radiation-absorbing fluid which is arranged bubble-free and air-tight in the housing or the chamber, is converted into heat; this increases the pressure in its turn within the fluid. The pressure sensor registers the increasing pressure which is proportional to the number of absorbed x-ray quanta. An electrical measurement signal may then be generated from this which may represent a precise measure of the absorbed x-radiation. When a suitable liquid is used a very high absorption and thus a measurement signal of high-quality may be achieved.

If the corresponding sensor elements are sufficiently small, when such sensor elements are used in a matrix-type arrangement, an x-ray detector with a high resolution in respect of localization of the absorbed x-ray quantas may be achieved. For example, silicon technology may be used to manufacture the sensor elements (with the exception of the fluid) to provide a relatively inexpensive and high-quality manufacturing of such an x-ray detector.

In accordance with an embodiment of the present disclosure the pressure sensor has a capacitor with a membrane, which capacitor changes its capacitance in accordance with the pressure experienced. In this way an electrical measurement signal can be generated directly and in a simple manner.

In accordance with a further embodiment of the present disclosure the fluid comprises iodine. Iodine is especially suitable for absorption of x-radiation. Especially advantageous fluids can for example be water-soluble contrast media based on triiodated benzene rings. Mercury can also be used as an alternative for example.

Figure 1:
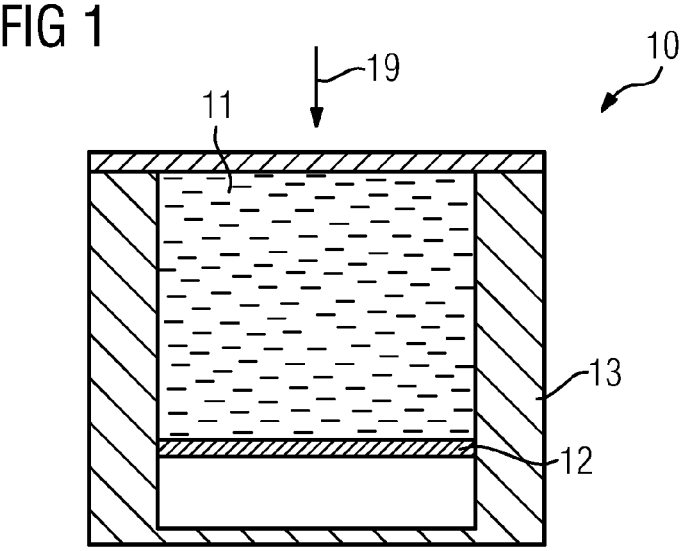
FIG. 1 shows a section through a sensor element with an x-radiation-absorbing fluid, according to certain embodiments.

A sensor element 10 having an x-radiation-absorbing fluid 11 arranged bubble-free in a housing is shown in FIG. 1, according to certain embodiments. The housing may be, for example, formed by a chamber arranged in a silicon substrate 13 which may be enclosed on all sides and on one side has a pressure sensor 12 as its closure.

In some embodiments, silicon technology is advantageously used to manufacture the sensor element. The chamber can, for example, be etched into the silicon substrate, subsequently the pressure sensor is applied, the fluid is poured into the chamber, and the chamber is sealed. The pressure sensor 12 may be formed, for example, by a capacitor with a thin, flexible membrane embodied such that a change in the pressure results in a change in the capacitance, which can be measured in turn. In some embodiments, the capacitor may consist of plates, for example, of which one is applied to the membrane; the membrane may be formed from $Si_3N_4$. An air-filled chamber may be arranged on the opposite side of the capacitor in relation to the fluid.

In some embodiments, when x-radiation 19 in the form of x-ray quanta strikes the sensor element 10 or the fluid in the chamber, the x-ray quanta are absorbed by the fluid 11 and converted into heat during this process. The heat in its turn increases the pressure in the fluid, which pressure can then be measured by the pressure sensor and converted into an electrical measurement signal. If a capacitor with the membrane is used the pressure is output directly as electrical charge.

In alternative embodiments, any other suitable type of pressure sensor can be used, for example inductive pressure sensors or piezoresistive or piezoelectric pressure sensors.

Figure 2:
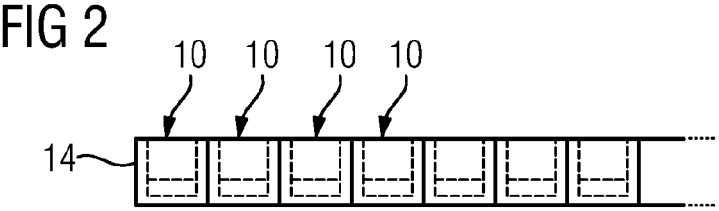
FIG. 2 shows a view of a matrix comprising a plurality of sensor elements, according to certain embodiments.

By arranging a plurality of sensor elements as pixels in an active matrix 14, as shown in FIG. 2 for example, it may be possible to manufacture an especially high-quality x-ray detector. For this purpose, the respective sensor elements may be manufactured sufficiently small, for example of the order of magnitude of 150×150 µm, or 100×100 µm, or smaller. In an x-ray detector of this type, the x-ray quanta may generate a measurement signal exactly at the location at which they have been absorbed; scattering across a number of pixels may be avoided or substantially avoided, as compared to the scattered light from a scintillator, for example. Thus, in some embodiments, the x-ray detector may have an especially high resolution. Further, by using fluids that exhibit an especially high x-ray absorption, based on iodine for example, a high signal yield can be created by the x-ray detector.

Figure 3:
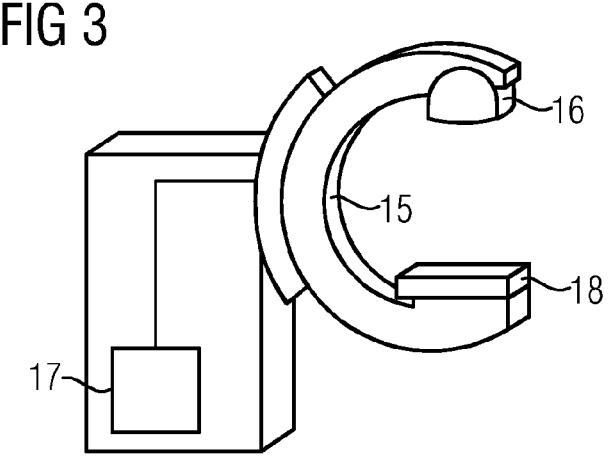
FIG. 3 shows an x-ray device with an x-ray detector, according to certain embodiments.

An example medical x-ray device having an x-ray detector 18 is shown in FIG. 3, according to certain embodiments. The x-ray detector 18 may be arranged jointly with an x-ray source 16 on a C-arm 15. X-ray detector 18 and x-ray source 15 may be controlled by a system controller 17 for recording x-ray images of an object under examination.

Thus, based on the above, certain embodiments may include a sensor element for converting x-radiation into an electrical measurement signal is provided for high-quality x-ray imaging, having an x-radiation-absorbing fluid arranged in a housing, and a pressure sensor arranged so that a pressure of the fluid on the pressure sensor is able to be measured by said sensor and is able to be converted into an electrical measurement signal. A plurality of such sensor elements may be arranged in a matrix-type arrangement to form an x-ray detector.

What is claimed is:

1. A sensor element for converting x-radiation into an electrical measurement signal, comprises:
   a chamber,
   an x-radiation-absorbing fluid arranged in the chamber, the x-radiation absorbing fluid including iodine, and
   a pressure sensor arranged to detect a pressure of the x-radiation-absorbing fluid and to convert the detected pressure into an electrical signal.

2. The sensor element of claim 1, wherein the pressure sensor includes a capacitor and a membrane.

3. The sensor element of claim 2, wherein the membrane comprises $Si_3N_4$.

4. The sensor element of claim 1, wherein the sensor element is fabricated at least partly in silicon.

5. The sensor element of claim 1, wherein the pressure sensor is arranged in the chamber such that a first sealed volume of the x-radiation-absorbing fluid is defined on a first side of the pressure sensor, and a second sealed volume of air is defined on a second, opposite side of the pressure sensor.

6. The sensor element of claim 1, wherein the sensor element is smaller than 150×150 µm.

7. The sensor element of claim 1, wherein the sensor element is smaller than 100×100 µm.

8. The sensor element of claim 1, wherein the sensor element does not include or receive radiation from a scintillator.

9. An x-ray detector comprising:
   an active matrix of a plurality of sensor elements, each sensor element including:
      a chamber,
      an x-radiation-absorbing fluid arranged in the chamber, the x-radiation-absorbing fluid including iodine, and
      a pressure sensor arranged to detect a pressure of the x-radiation-absorbing fluid and to convert the detected pressure into an electrical signal.

10. The x-ray detector of claim 9, wherein each pressure sensor includes a capacitor and a membrane.

11. The x-ray detector of claim 9, wherein each sensor element is fabricated at least partly in silicon.

12. The x-ray detector of claim 9, wherein each pressure sensor is arranged in a respective chamber such that a first sealed volume of the x-radiation-absorbing fluid is defined on a first side of the pressure sensor, and a second sealed volume of air is defined on a second, opposite side of the pressure sensor.

13. The x-ray detector of claim 9, wherein the x-ray detector does not include a scintillator.

14. A medical x-ray device comprising:
   an x-ray source, and
   an x-ray detector comprising:
      an active matrix of a plurality of sensor elements, each sensor element including:
         a chamber,
         an x-radiation-absorbing fluid arranged in the chamber, the x-radiation-absorbing fluid including iodine, and
         a pressure sensor arranged to detect a pressure of the x-radiation-absorbing fluid and to convert the detected pressure into an electrical signal.

15. The medical x-ray device of claim 14, wherein the medical x-ray device does not include a scintillator.

16. The medical x-ray device of claim 14, wherein each pressure sensor includes a capacitor and a membrane.

17. The medical x-ray device of claim 14, wherein the x-ray source and the x-ray detector are arranged jointly on a C-shaped arm.

18. The medical x-ray device of claim 14, further comprising a controller configured to control the x-ray source and the x-ray detector.

* * * * *